United States Patent
Panek-Rickerson

(10) Patent No.: US 9,497,384 B2
(45) Date of Patent: Nov. 15, 2016

(54) TEMPLATE PHOTOGRAPHY AND METHODS OF USING THE SAME

(71) Applicant: Kathleen Panek-Rickerson, Saint Charles, IL (US)

(72) Inventor: Kathleen Panek-Rickerson, Saint Charles, IL (US)

(*) Notice: Subject to any disclaimer, the term of this patent is extended or adjusted under 35 U.S.C. 154(b) by 72 days.

(21) Appl. No.: 14/554,157

(22) Filed: Nov. 26, 2014

(65) Prior Publication Data

US 2015/0146042 A1 May 28, 2015

Related U.S. Application Data

(60) Provisional application No. 61/909,113, filed on Nov. 26, 2013.

(51) Int. Cl.
H04N 5/232 (2006.01)
H04N 5/235 (2006.01)
H04N 5/262 (2006.01)

(52) U.S. Cl.
CPC ........ *H04N 5/23293* (2013.01); *H04N 5/2356* (2013.01); *H04N 5/23222* (2013.01); *H04N 5/2621* (2013.01)

(58) Field of Classification Search
CPC ..................... H04N 5/23293; H04N 5/23222; H04N 5/265; H04N 5/2356; H04N 5/2621; H04N 5/2322
USPC ................. 348/207.11, 208.6, 208.14, 211.2, 348/218.1, 239, 333.03, 333.04
See application file for complete search history.

(56) References Cited

U.S. PATENT DOCUMENTS

| | | | | |
|---|---|---|---|---|
| 6,606,117 | B1* | 8/2003 | Windle | H04N 1/00183 348/222.1 |
| 8,132,096 | B1* | 3/2012 | Widdowson | H04N 1/387 382/209 |
| 8,228,413 | B2* | 7/2012 | Ellenby | G03B 17/24 348/207.11 |
| 8,332,429 | B2* | 12/2012 | Poirier | G06F 17/30241 707/781 |
| 8,531,576 | B2* | 9/2013 | Kasahara | G03B 17/20 348/333.02 |
| 9,232,143 | B2* | 1/2016 | Jayaraj | H04N 5/23293 |
| 9,270,901 | B2* | 2/2016 | Iki | H04N 5/23293 |
| 2003/0169350 | A1* | 9/2003 | Wiezel | H04N 5/23293 348/239 |
| 2005/0088542 | A1* | 4/2005 | Stavely | H04N 5/23222 348/239 |
| 2009/0162042 | A1* | 6/2009 | Wexler | H04N 5/23222 396/49 |

* cited by examiner

*Primary Examiner* — Hung Lam
(74) *Attorney, Agent, or Firm* — Scherrer Patent & Trademark Law, P.C.; Stephen T. Scherrer; Monique A. Morneault

(57) ABSTRACT

The present invention relates to posing subjects for a photograph. Specifically, the present invention relates to a device and method for posing subjects. Even more specifically, the present invention relates to providing pre-determined stencil filters that photographers may use to pose or otherwise arrange subjects on camera. The pre-determined stencil filters allow amateur artists to take professional quality photographs.

18 Claims, 3 Drawing Sheets

TEMPLATE PHOTOGRAPHY AND METHODS OF USING THE SAME

This application claims priority to U.S. Provisional Patent Application No. 61/909,113, titled "Template Photography and Methods of Using the Same," filed on Nov. 26, 2013, which is incorporated herein in its entirety.

TECHNICAL FIELD

The present invention relates to posing subjects for a photograph. Specifically, the present invention relates to a device and method for posing subjects for professional quality photographs. The present invention may be utilized on a photograph capturing device, such as a camera, a smart phone, or any other device.

BACKGROUND

It is, of course, generally known to take photographs of events, people, and everyday objects. Photographs are one of many ways of documenting events, and are often used to preserve memories of people, places and/or things.

Photography, like other forms of art, is often more than simply pointing a camera and taking a shot. Photographers, including amateurs and professional artists, can spend long periods of time and expend much energy manipulating a subject in a certain way, such as in a particular pose, to obtain a quality photograph. Sometimes, subjects are not very photogenic, meaning that the photograph of the subject does not flatter the subject of the photograph. With help, a photographer may increase the quality of the non-photogenic subject's photograph.

Often, there are specific techniques known to those skilled in the art that increase the quality of photographs. Certain expressions, poses, arrangements, moods, themes, etc. may appear better in photographs than others. Additionally, certain photographs may be best only in certain lighting, environment, location, and other like factors. Also, the addition of filters or other photographic manipulation, such as taking or changing a photograph in color, black and white and sepia, or manipulating the photograph using distortion, fish eye, or other filters may make certain photographs appear better to viewers. It is often difficult, however, without formal training, to utilize these techniques to take quality photographs. A need, therefore, exists for a device and method of taking photographs that allows users to easily use one or more specific techniques to enhance the quality of the photograph.

Commonly, an artist may arrange his or her subjects, known as posing, for a photograph. If the artist is in a private location, the artist may be able to more easily control various aspects of the photograph. If the subject is a live subject, however, it is often difficult for the artist to obtain the intended expression, pose, arrangement, mood, theme, or the like. Further, in a public location, random events, people, and everyday objects can interfere, block, or otherwise disrupt a photograph. A photographer may miss an opportunity and lose the intended expression, pose, and/or mood, as a result of this disruption. It is often difficult to recapture a missed opportunity because the moment has fleeted or the photographer cannot articulate what that opportunity was or the subject cannot appreciate what the photographer was trying to do.

Generally, artists prefer having complete control over what goes into a photograph. In this regard, it is common for artists to photograph in private locations. Without disruptions, the artist may be able to direct or instruct the subject to obtain a specific expression, pose, arrangement, mood, and/or theme. Often, this requires an artist to direct a subject, choose a shooting location, and repeat these steps until the artist is satisfied. Oftentimes, the artist must physically move the subject into the intended pose or arrangement. When ready for shooting, the subject may have moved, the lighting may have changed, or something else may have occurred to cause difficulty for the photographer. Alternatively, the artist may attempt to verbally direct the subject into a particular pose. Often, it is difficult for a photographer to communicate to a subject how to pose a particular way.

Frequently, photographers have inspiration in their minds that they cannot articulate accurately. This may be due to not having enough time to fully describe the idea, not having enough time to perfectly pose the subjects, frustration with subjects or the environment, or other inefficiencies. Often photographers have to rely on standard expressions, poses, arrangements, moods and/or themes. A need exists for a device and method of photographing that aids in portraying the photographer's inspiration besides verbal instruction or physical posing.

Commonly, when a photograph is taken, the results are not what the photographer had intended. The photographer may have had a picture in his or her mind that he or she cannot articulate well or cannot capture as well as previously anticipated. As a result, the photographer may not have captured the expression, pose, arrangement, mood and/or theme that the photographer had intended to capture. Many post-photograph manipulation programs have been created that allow an artist to reshape an already taken photograph to what they may have intended. These programs, such as Adobe® Photoshop®, may not provide the level of photographic manipulation required to remediate the photograph. Moreover, these programs are often complicated and difficult to master. Additionally, a need exists for a device and method for taking photographs that allows a photographer to capture an intended expression, pose, arrangement, mood and/or theme.

Frequently, the photographer taking the photograph is the subject of the photograph. Self-portrait photographs, known as "selfies," have become increasingly popular due to more easily accessible photograph equipment that allows a user to easily point the camera at his or herself and see the results through a view screen. However, certain poses or arrangements may be difficult when the photographer is the subject of the photograph. A need, therefore, exists for a device and method of photographing that allows photographers to more easily take self-portraits in particular poses.

Commonly, advanced camera equipment has certain capabilities such as face detection. Face detection software, generally, recognizes a subject's face and projects a square around the subjects face on the camera's digital display. This software interacts with the camera's autofocus in order to focus more on the subject's face. However, this software fails to aide in a photographer's arrangement or portrayal of the photographer's expression, and in certain cases may impede or distract an photographer from taking a photograph with an intended pose or mood.

SUMMARY OF THE INVENTION

The present invention relates to posing subjects for a photograph. Specifically, the present invention relates to a device and method for posing subjects. Even more specifically, the present invention relates to providing pre-determined stencil filters that photographers may use to pose or otherwise arrange subjects on camera. The pre-determined stencil filters allow amateur photographers to easily take high quality photographs.

To this end, in an embodiment of the present invention, a photographing device is provided. The photographing device comprises a camera having a digital display capable of presenting an image, and a stencil filter displayable on the digital display, wherein the stencil filter is temporarily overlaid on the image prior to taking a photo, allowing a user to manipulate a subject in the same manner as the stencil filter.

In an alternate embodiment of the present invention, a photographing method is provided. The photographing method comprises the steps of providing a subject to be photographed, providing a camera having a digital display capable of presenting an image of the subject, overlaying a stencil filter on the digital display, aligning the stencil filter such that the stencil filter outlines the image of the subject, and taking a photograph of the subject.

It is, therefore, an advantage and objective of the present invention to provide a device and method of photographing that allows anyone to specifically pose subjects in a particular manner.

Also, it is an advantage and objective of the present invention to provide a device and method of photographing that aids a photographer in setting his or her subject in a particular pose to create a particular mood.

Additionally, it is an advantage and objective of the present invention to provide a device and method of photographing that allows a photographer to capture an intended expression, pose, arrangement, mood and/or theme.

Moreover, it is an advantage and objective of the present invention to provide a device and method of photographing that allows amateur photographers to easily create high quality photographs.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to posing subjects for a photograph. Specifically, the present invention relates to a device and method for posing subjects. Even more specifically, the present invention relates to providing pre-determined stencil filters that photographers may use to pose or otherwise arrange subjects on camera. The pre-determined stencil filters allow amateur artists to easily take high quality photographs.

Figure 1:
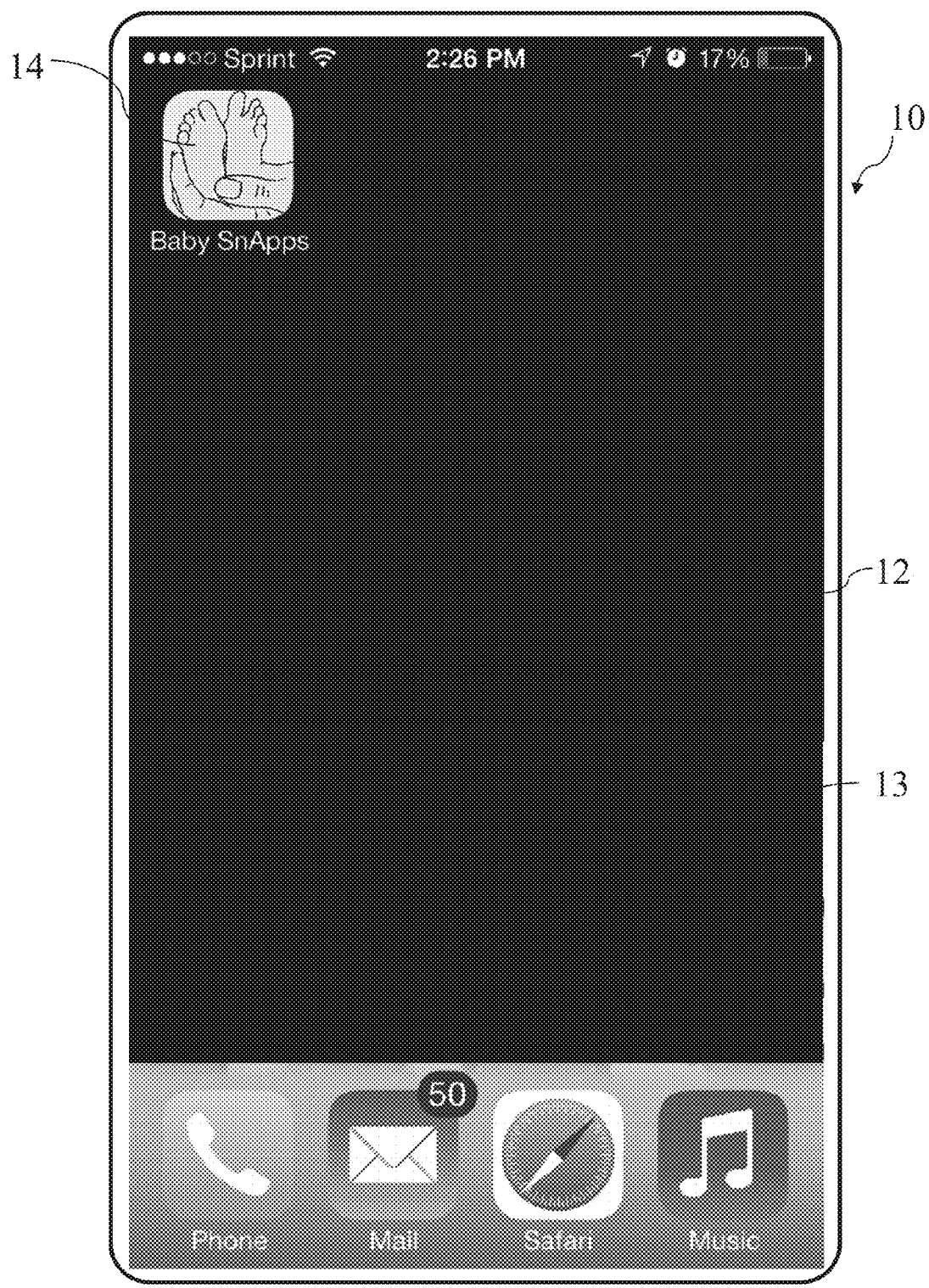
FIG. 1 illustrates a photographing device, in the form of a smart phone having photography capability and an app, in an embodiment of the present invention.

Now referring to the figures, wherein like numerals refer to like parts, FIG. 1 illustrates a photographing device 10.

The photographing device 10 may be a mobile device such as a digital camera, iPhone, android, windows phone, iPod, iPad, or other mobile device known to one skilled in the art. Of course the photographing device 10 may be a more permanent fixture such as a camera, web-camera, security camera, red-light camera, or other photographing device known to one skilled in the art. The photographing device 10 may have a display screen 12. The display screen 12 may present a home screen 13, but may also display other images such as an image obtained by a camera (not shown) on the photographing device 10. Similar to modern digital cameras, iPhones, androids, windows phones, iPods, and iPads, the display screen 12 of the photographing device 10 may be a touch screen that a user may interact with by touch.

Figure 2:
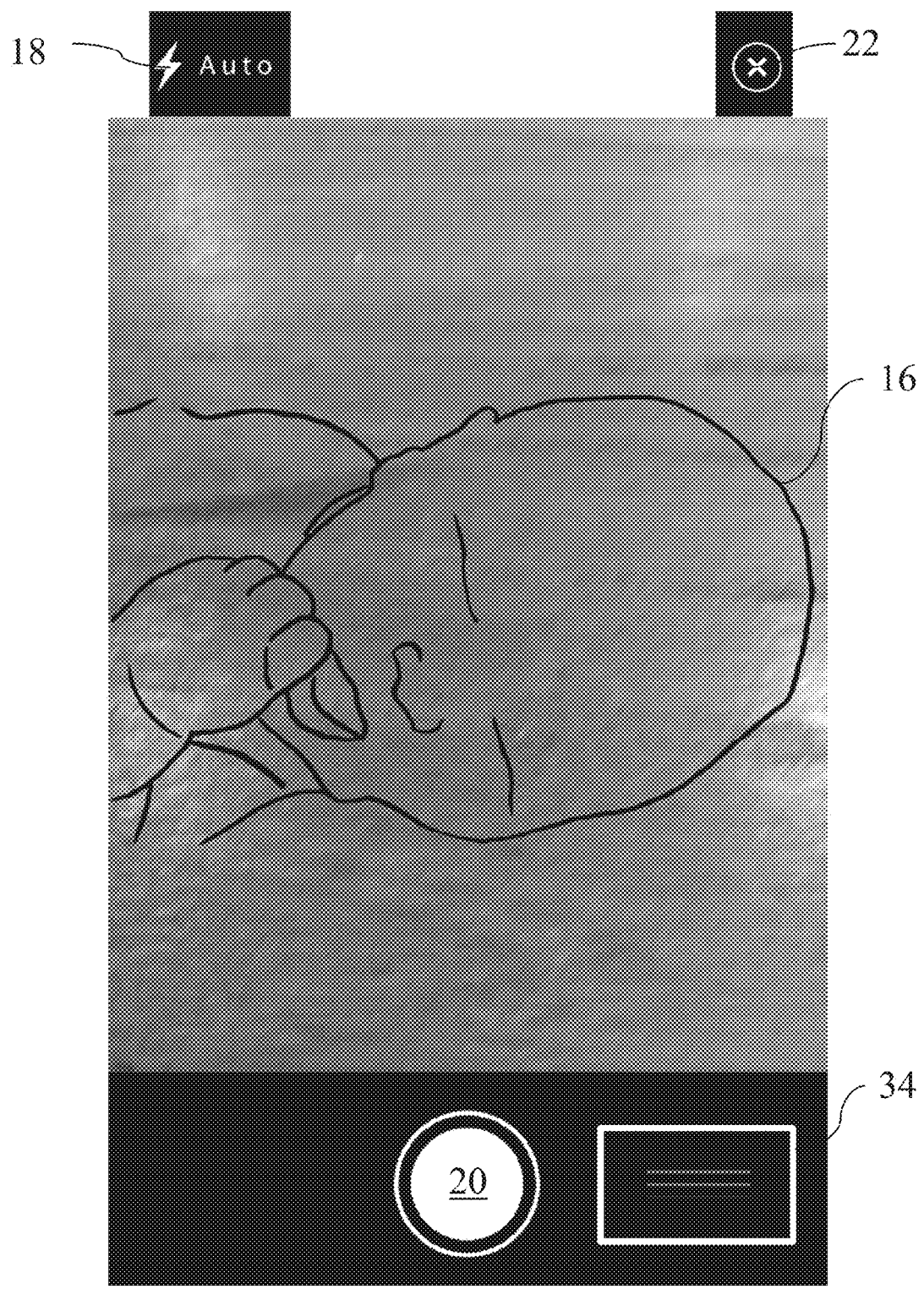
FIG. 2 illustrates a stencil filter for a photographing device in an embodiment of the present invention.

The photographing device 10 may further have an interaction control 14 that may turn on a stencil filter 16 as shown in FIG. 2. In a preferred embodiment, the interaction control 14 may be an application installed on the photographing device 10. The application may be pre-installed on the photographing device 10 or may be downloaded from an online marketplace, another application, a website, or the like. Additionally, the application may be available in multiple tiers, such as but not limited to one tier being a free application that has a plurality of advertisements associated therein, and another tier being a paid application without advertisements.

The stencil filter 16 may be an outline image that may be overlaid on the display screen 12. The stencil filter 16 may perfectly encompass a specific expression, pose, arrangement, mood, theme, or other outline for posing a subject. Preferably, the stencil filter 16 may allow a user to create a high quality photograph by aligning the stencil filter 16 with an image of a subject. The subject may be a person, place, or thing, such as a person, an animal, a group of people or animals, or an object. The stencil filter 16 may be used concurrently with the camera (not shown) and a camera tool 18 and a photo button 20. The photographing device 10 may further have a disconnect or cancel button 22.

A user may be able to use the stencil filter 16 to take a photograph of a subject in a particular pose, as shown by the stencil filter 16. Specifically, the user may choose one particular stencil filter from a plurality of stencil filters depending on the particular pose the photographer wishes his or her subject to have. Once the stencil filter 16 is selected, it may provide the stencil filter 16 as an overlay over the screen 12, or otherwise in a view that the photographer uses to take the photograph.

The photographer may line the subject up with the stencil filter 16 overlaid on the display screen 12, as illustrated in FIG. 2. The stencil filter 16 may have lines that generally impart the particular pose to the photographer, preferably without distracting the photographer or otherwise restricting the view of the subject on the screen. The photographer may adjust the photographing device 10, typically by moving the same or adjusting zoom, to align the stencil filter 16 with the image of the subject on the display screen 12 or the user may adjust the subject to align the subject with the stencil filter 16.

Prior to taking a photograph, the user may use the camera tools 18 in order to change the focus type such as manual or auto; change the flash settings such as on, off, auto; change the color settings such as sepia, color, black and white; or other camera settings known to one skilled in the art. Once the subject is aligned with the stencil filter 16, the user may take a photograph of the subject by using the photo button 20. The photo button 20 may be a physical button or may be a portion of a touch screen and interaction therewith may cause a photograph to be taken. The photograph typically would not include the stencil filter 16 as a part of the photograph; however, it is an object of the present invention that the subject of the photograph would still be aligned in the pose presented by the stencil filter. Alternatively, the stencil filter 16 may be displayed temporarily and may disappear prior to taking the photograph. The user may close the stencil filter 16 by using the disconnect or cancel button 22 and may return to the home screen 13 shown in FIG. 1. By aligning the stencil filter 16 with a subject prior to taking a photograph, an amateur photographer may take high quality photos.

After a photograph is taken, the photograph may be saved in a tangible storage medium disposed within the photographing device or may be uploaded to an external storage medium. The external storage medium may be a removable memory card, or may be storage accessible only over the internet, otherwise known as cloud storage. A plurality of editing tools may be displayed over the photograph such that the user may edit the photograph prior to saving. Some of the editing tools may include cropping, adding a background image, adding a foreground image, adding text, resizing, recoloring, touching up, or other editing tool known to one skilled in the art. Of course, the user may share the photograph via text, e-mail, Twitter, Facebook, Instagram, or other social media known to one skilled in the art. The photographing device may have a sharing button to allow access to text, e-mail, Twitter, Facebook, Instagram, or other social media directly from the photographing device 10.

In an alternate embodiment of the present invention, the photographing device 10 may be used to take time lapse photos, panoramic photos, or videos. In one embodiment, the stencil filter 16 may be adapted to the respective mode of operation the photographing device 10 may be. For example, multiple stencil filters 16 may be displayed sequentially in which a user may pose a subject and take an image, such that when viewing the taken images sequentially, they appear to be in motion.

Figure 3:
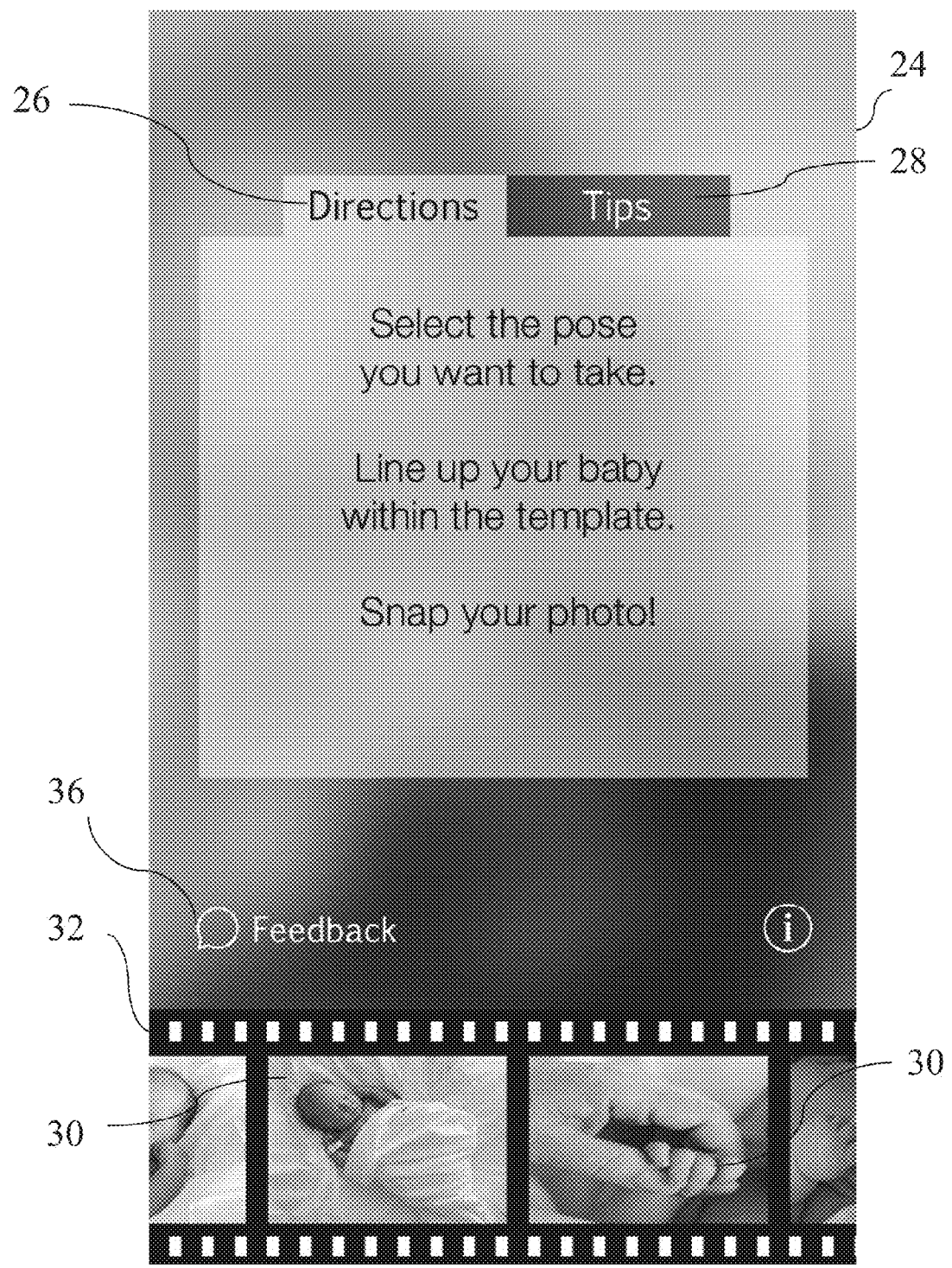
FIG. 3 illustrates a selection screen in an embodiment of the present invention.

The photographing device 10 may further have a selection screen 24 shown in FIG. 3 that may be displayed prior to the stencil filter 16. Specifically, the selection screen 24 may have a set of instructions or directions 26 and may have a set of tricks or tips 28. The set of instructions or directions 26 may help a user use the photographing device 10. The set of tricks or tips 28 may teach a user how to take professional quality photos or how to use the photographing device 10 with more advanced techniques. The selection screen 24 may have a plurality of templates 30, displayed as one or more actual photographs of subjects, as shown in FIG. 3, disposed in a scrollable representation 32. The scrollable representation 32 may be in the form of a film strip as shown in FIG. 3, but may be presented in any form known to one skilled in the art. A user may scroll through the scrollable representation 32, independently of the selection screen 24, to display more templates than the plurality of templates 30 originally presented on the selection screen 24. The scrollable representation 32 may be accessible from the stencil filter 16 by activating the selection button 34 shown in FIG. 2. The selection button 34 may display the scrollable representation 32 and the plurality of templates 30 along a bottom of the photographing device 10. As shown in FIG. 3, the plurality of templates 30 may be baby poses. However, any representation may be provided in the plurality of templates 30, such that the plurality of templates aid in allowing a user to take a similar style photograph of any subject, such as any person, animal, or other object.

A user may select one of the plurality of templates 30 within the scrollable representation 32. When selected, a stencil filter representing the chosen template may be displayed similarly to the stencil filter 16 discussed above. When a new stencil filter is chosen, the old stencil filter may be removed such that only one stencil filter is displayed at one time. Alternatively, the old stencil filter may be displayed concurrently with the new stencil filter. Indeed, the plurality of templates 30 may be presented in such a way that multiple templates and corresponding stencil filters may be used conjunctively to create new templates and stencil filters.

The photographing device 10 may come with the plurality of templates 30 pre-loaded. However, the plurality of templates 30 may be downloadable as well. Additionally, more templates may be optionally downloadable or purchased. Any downloaded or purchased templates may automatically be added to the existing plurality of templates 30. A user may give feedback using a contact button 36. The contact button 36 may allow a user to rate the photographing device 10 or otherwise contact the developers via a link to a website or a link to an email address.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. An apparatus for professionally photographing a subject, the apparatus comprising:
    a camera lens capable of receiving and relaying light and other visual information;
    an image processor disposed behind the camera lens capable of converting light and other visual information into digital data;
    a digital display electrically connected to the image processor, wherein the digital display presents an image representative of the light and other visual information relayed from the camera lens;
    a photograph of a first subject displayed on the digital display, the photograph configured to be selected by a user;
    a stencil filter corresponding to the photograph of the first subject and configured to be displayed on the digital display when the photograph of the first subject is selected by the user, wherein the stencil filter comprises at least one line forming an outline of the first subject, wherein the at least one line of the stencil filter is configured to being matched to at least one corresponding feature of a second subject that is visible on the digital display prior to photographing the second subject; and
    a storage medium electrically connected to the image processor that records a copy of the image of the second subject presented on the digital display without the stencil filter.

2. The apparatus of claim 1 wherein the stencil filter is an outline of a baby.

3. The apparatus of claim 1 wherein the stencil filter is temporarily displayed on the digital display, overlaying the image of the second subject prior to recording the copy of the image of the second subject and disappearing from the display when the copy of the image is recorded.

4. The apparatus of claim 1 further comprising a physical button, wherein the copy of the image of the second subject presented on the digital display is recorded when a user interacts with the physical button.

5. The apparatus claim 1 wherein the digital display is a touch screen and wherein the copy of the image of the second subject presented on the digital display is recorded when a user interacts with the touch screen.

6. The apparatus of claim 1 further comprising a plurality of camera settings, the camera settings selected from the group consisting of color settings, flash settings, focus settings, recording settings, stencil filter settings, and any combination thereof.

7. The apparatus of claim 1 further comprising a plurality of additional photographs selectable by a user, corresponding to additional stencil filters, wherein the additional stencil filters are configured to be displayed over the image on the digital display upon selection.

8. The apparatus of claim 7 wherein the plurality of additional photographs are disposed in a scrollable configuration on a portion of the display screen, further wherein the plurality of additional photographs are scrollable independent of the image on the display screen.

9. The apparatus of claim 1 further comprising a plurality of editing tools, the editing tools selected from the group consisting of a cropping tool, an add background image tool, an add foreground image tool, an add text tool, a resize tool, a recolor tool, a touch up tool, and any combinations thereof.

10. The apparatus of claim 1 further comprising wireless connectivity to the internet, wherein addition stencil filters are purchasable and downloadable therefrom, and images are uploadable and shareable thereto.

11. A process for professionally photographing a subject, the process comprising the steps of:
    providing a photograph of a first subject displayed on a digital display of a photographing device and configured to be selected by a user;
    providing a stencil filter corresponding to the first subject of the photograph and configured to be displayed on the digital display of the photographing device when the photograph of the first subject is selected by the user;
    selecting the at least one photograph, wherein selecting the photograph causes the stencil filter corresponding to the first subject of the photograph to be displayed on the digital display, wherein the stencil filter comprises at least one line forming an outline of a second subject to be photographed, wherein the at least one line of the stencil filter is configured to being matched to at least one corresponding feature of the subject during photography of the subject;
    aligning an image of the second subject on the digital display with the at least one line of the stencil filter displayed on the digital display;
    providing image capturing capabilities of the second subject outlined by the stencil filter;
    capturing the image of the second subject; and
    storing the image captured of the second subject without the stencil filter incorporated therein.

12. The process of claim 11 further comprising the steps of:
    displaying the at least one stencil filter on the digital display of the photographing device;
    recognizing a command to capture the image of the second subject outlined by the stencil filter;
    capturing the image of the second subject outlined by the stencil filter; and
    removing the stencil filter prior to storing the image of the subject.

13. The process of claim 11 further comprising the steps of:
    displaying the at least one stencil filter on the digital display of the photographing device;
    recognizing a command to capture the image of the second subject outlined by the stencil filter;
    removing the stencil filter prior to capturing the image of the second subject; and
    capturing the image of the second subject.

14. The process of claim 11 wherein the stencil filter is an outline of a baby.

15. The process of claim 11 further comprising the step of providing a plurality of camera settings, the camera settings selected from the group consisting of color settings, flash settings, focus settings, recording settings, stencil filter settings, and any combination thereof.

16. The process of claim 11 further comprising the step of providing a plurality of editing tools, the editing tools selected from the group consisting of a cropping tool, an add background image tool, an add foreground image tool, an add text tool, a resize tool, a recolor tool, a touch up tool, and any combinations thereof.

17. The process of claim 11 further comprising the steps of:
    providing wireless connectivity to the Internet;
    providing options to purchase and download additional stencil filters corresponding to additional photographs; and
    providing options to upload and share images.

18. The process of claim 11 further comprising the steps of:
    providing a plurality of additional photographs selectable by the user corresponding to a plurality of additional stencil filters; and
    providing a scrollable configuration organizing the plurality of additional photographs.

\* \* \* \* \*